(12) United States Patent
Bae

(10) Patent No.: US 6,585,620 B1
(45) Date of Patent: Jul. 1, 2003

(54) REDUCTION APPARATUS

(76) Inventor: Myung-Soon Bae, 101-1504 Daeback Apt., 540 Okkye-dong, Gimi-shi, Kyungsangbuk-do 730-380 (KR)

( * ) Notice: Subject to any disclaimer, the term of this patent is extended or adjusted under 35 U.S.C. 154(b) by 0 days.

(21) Appl. No.: 09/979,459
(22) PCT Filed: May 16, 2000
(86) PCT No.: PCT/KR00/00471
§ 371 (c)(1), (2), (4) Date: Nov. 19, 2001
(87) PCT Pub. No.: WO00/71910
PCT Pub. Date: Nov. 30, 2000

(30) Foreign Application Priority Data

May 20, 1999 (KR) ........................ 1999-18166

(51) Int. Cl.[7] .............................................. F16H 57/08
(52) U.S. Cl. ....................................... 475/331; 475/344
(58) Field of Search ................................ 475/331, 340, 475/344, 346

(56) References Cited

U.S. PATENT DOCUMENTS

| | | | | |
|---|---|---|---|---|
| 1,499,763 A | * | 7/1924 | Davis | 475/344 |
| 3,675,510 A | * | 7/1972 | Duggar, Jr. | 475/346 |
| 3,915,031 A | * | 10/1975 | Hanson | 475/249 |
| 4,043,226 A | * | 8/1977 | Buuck | 475/331 |
| 5,385,514 A | * | 1/1995 | Dawe | 475/340 |
| 5,462,498 A | * | 10/1995 | Lindblad | 475/342 |
| 6,033,336 A | * | 3/2000 | Bae | 475/341 |

FOREIGN PATENT DOCUMENTS

| | | | |
|---|---|---|---|
| JP | 6-33995 | 1/1994 | |
| JP | 5-221913 | 8/1994 | |
| JP | 6-241282 | 8/1994 | |
| KR | 96-1549 | 1/1996 | |
| KR | 98-19936 | 5/1998 | 475/341 |

* cited by examiner

Primary Examiner—Sherry Estremsky
(74) Attorney, Agent, or Firm—Knobbe, Martens, Olson, and Bear, LLP

(57) ABSTRACT

A reduction apparatus comprises a case having case parts assembled to define a receiving space; a fixed ring gear coupled to the case parts; an output member having an output ring gear having a gear ratio and a module which are different from those of the fixed ring gear and an output shaft projecting out of the case; a carrier having a first carrier member which has a guide projection and an input shaft-guiding groove and a second carrier member which defines together with the first carrier member an accommodating space; an input shaft having a shaft portion, a first sun gear and a second sun gear which are located between the first and second carrier members; first planetary gears fitted around first connecting members and meshed with the first sun gear; and second planetary gears fitted around second connecting members and meshed with the second sun gear.

3 Claims, 6 Drawing Sheets

FIG. 5
(A)
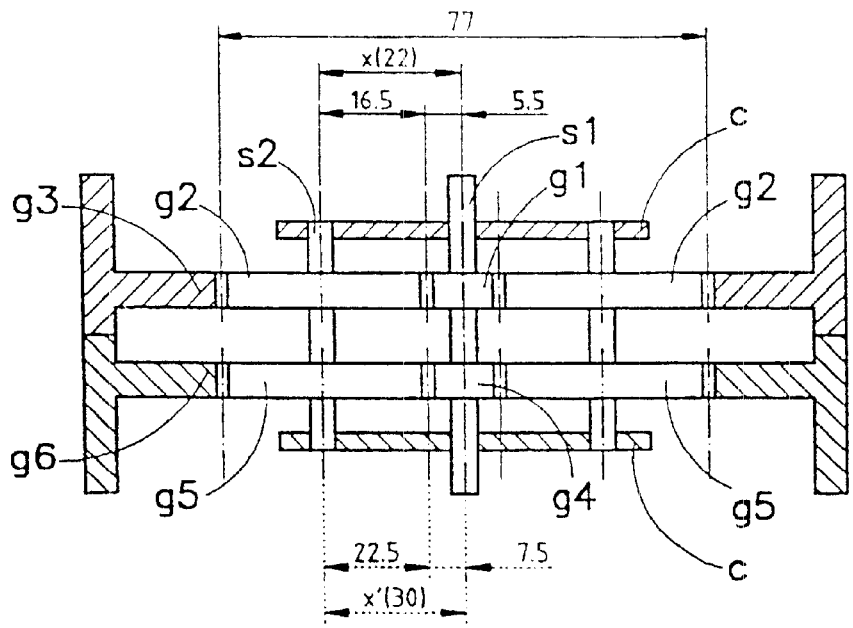
(B)
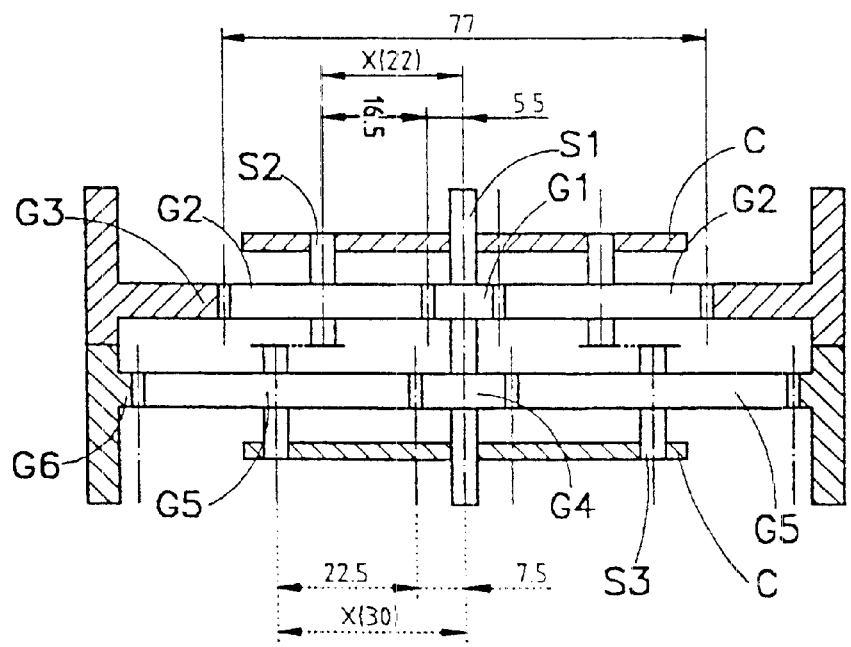

REDUCTION APPARATUS

TECHNICAL FIELD

The present invention relates to a reduction apparatus, and more particularly, the present invention relates to a reduction apparatus which can be applied to power transmission systems for a variety of machines and which uses planetary gears to reduce a rotational velocity of an output shaft in the course of transferring a rotational velocity of an input shaft to the output shaft, thereby enabling a large and highly precise reduction ratio to be obtained.

BACKGROUND ART

Generally, various machine tools or industrial machines are equipped with a reduction apparatus which serves to change a driving RPM generated by and transferred from a power source to other RPMs suitable for operating them. The reduction apparatus must be provided with a separate reverse rotation preventing device for braking a reverse load which is transferred to an input shaft from an output shaft when a power source is shut off.

However, the conventional reduction apparatus suffers from defects in that a combination of spur gears, warm gears and the like, is used, a kinetic mechanism is involved. Also, since the whole load acts on only a single tooth, one at a time when gears are meshed one with another, each tooth is apt to be abraded whereby durability and operation reliability of the reduction apparatus are deteriorated. Further, because the reverse rotation preventing device must be provided, the number of components is increased.

To resolve these defects, a reduction apparatus having a reverse rotating preventing function which is described in Korean Patent Application No. 98-19936 filed on May 29, 1998, had been disclosed in the art by the present applicant.

In the reduction apparatus having a reverse rotating preventing function, if power is applied to an input shaft 60 from driving means, a carrier 40 which is integrally formed with the input shaft 60, is rotated, and a double planetary gears 50 which are disposed in a receiving room 46 defined in the carrier 40, rotates about their own axes. The double planetary gear 50 also revolves due to the fact that a first planetary gear part 52 of the double planetary gear 50 is meshed with a fixed ring gear 20. At the same time, by the fact that a second planetary gear part 54 of the double planetary gear 50 is meshed with an output ring gear 34, an output member 30 including an output shaft 32 is rotated. At this time, a rotational velocity of the input shaft 60 which is rotated by the driving means (not shown), is reduced by a difference in the number of teeth or the module between the first and second planetary gear parts 52 and 54 or between the fixed ring gear 20 and the output ring gear 34, by which the reduced rotational velocity represents a rotational velocity of the output shaft 32.

Also, if no load is transferred to the input shaft 60 from the driving means, force for rotating the input shaft 60 in a reverse direction is generated due to a reverse load produced by the output shaft 32. At this time, even though the reverse load is transferred to the second planetary gear part 54 of the double planetary gear 50 through the output ring gear 34 of the output member 30, since the first planetary gear part 52 of the double planetary gear 50 having the number of teeth or the module which is different from that of the second planetary gear part 52, is meshed with the fixed ring gear 20, the reverse load is braked not to be transferred to the input shaft 60, whereby it is possible to perform a reverse rotation preventing function.

However, the conventional reduction apparatus having the reverse rotation preventing function is still encountered with a problem in that, since a reduction ratio is determined by a difference in the numbers of teeth of the first and second planetary gear parts 52 and 54 of the double planetary gear 50, a maximum reduction ratio which can be obtained with the conventional reduction apparatus, is a reduction ratio which is achieved when the number of second planetary gear part 54 is smaller by 1 than the number of first planetary gear part 52, whereby a limitation is imposed upon realizing a large and highly precise reduction ratio.

In other words, in the convention reduction apparatus, because the first and second planetary gear parts 52 and 54 have the same rotating shaft, distances from a center line of the input line 60 to center lines of the first and second planetary gear parts 52 and 54 are the same, in the case that modules which are formed in the first and second planetary gear parts 52 and 54, are differentiated from each other, the first and second planetary gears 52 and 54 cannot be adequately arranged, whereby a highly precise reduction ratio which is obtained by differentiating modules of the gears, cannot be realized.

DISCLOSURE OF INVENTION

Accordingly, the present invention has been made in an effort to solve the problems occurring in the related art, and an object of the present invention is to provide a reduction apparatus using planetary gears, in which a separate rotating shaft is provided for each of the planetary gears, thereby to accomplish a large and highly precise reduction ratio.

In order to achieve the above object, according to the present invention, there is provided a reduction apparatus comprising: a cylindrical case having a pair of case parts which are detachably assembled with each other to define a receiving space; a fixed ring gear sandwiched between and coupled to the pair of case parts and having teeth which are formed on a circumferential inner surface thereof; an output member rotatably received in the receiving space of the case and having an output ring gear and an output shaft, the output ring gear being formed on a circumferential inner surface of the output member in a manner such that the output ring gear has an inner diameter which is the same as that of the fixed ring gear and a gear ratio and a module which are respectively different from those of the fixed ring gear, the output shaft being integrally formed on an outer surface of the output member to project out of the case; a carrier having a first carrier member and a second carrier member, the first carrier member possessing a circular plate-shaped configuration and having a guide projection and an input shaft-guiding groove, the guide projection being formed at a center portion of an outer surface of the first carrier member to be rotatably supported on an inner surface of the output member, the input shaft-guiding groove being defined at a center portion of an inner surface of the first carrier member, the second carrier member being arranged to be opposite to the first carrier member with a predetermined separation and to define an accommodating space between the first and second carrier members, the second carrier member having an input shaft-inserting hole which is defined at a center portion thereof; an input shaft having a shaft portion which is rotatably supported at one end thereof in the input shaft-guiding groove of the first carrier member and projects at the other end thereof out of the case through the input shaft-inserting hole of the second carrier member, the input shaft further having a first sun gear and a second sun gear which are formed on a circumferential outer surface of the shaft portion in a manner such that the first and second sun gears are located between the first and second carrier members and a gap is defined therebetween; a plurality of first planetary gears rotatably fitted around a plurality of first connecting members, respectively, which are secured to the first and second carrier members in a manner such that the first connecting members are spaced apart one from another by a predetermined angle along a circumferential direction, the first planetary gears being meshed with the first sun gear of the input shaft; and a plurality of second planetary gears rotatably fitted around a plurality of second connecting members, respectively, which are secured to the first and second carrier members in a manner such that each second connecting member is positioned between two first planetary gears in the circumferential direction, the second planetary gears being meshed with the second sun gear of the input shaft.

BRIEF DESCRIPTION OF DRAWINGS

The above objects, and other features and advantages of the present invention will become more apparent after a reading of the following detailed description when taken in conjunction with the drawings, in which:

FIG. 5 is a cross-sectional view for explaining operations of the reduction apparatus in accordance with the embodiment of the present invention.

BEST MODE FOR CARRYING OUT THE INVENTION

Figure 1:
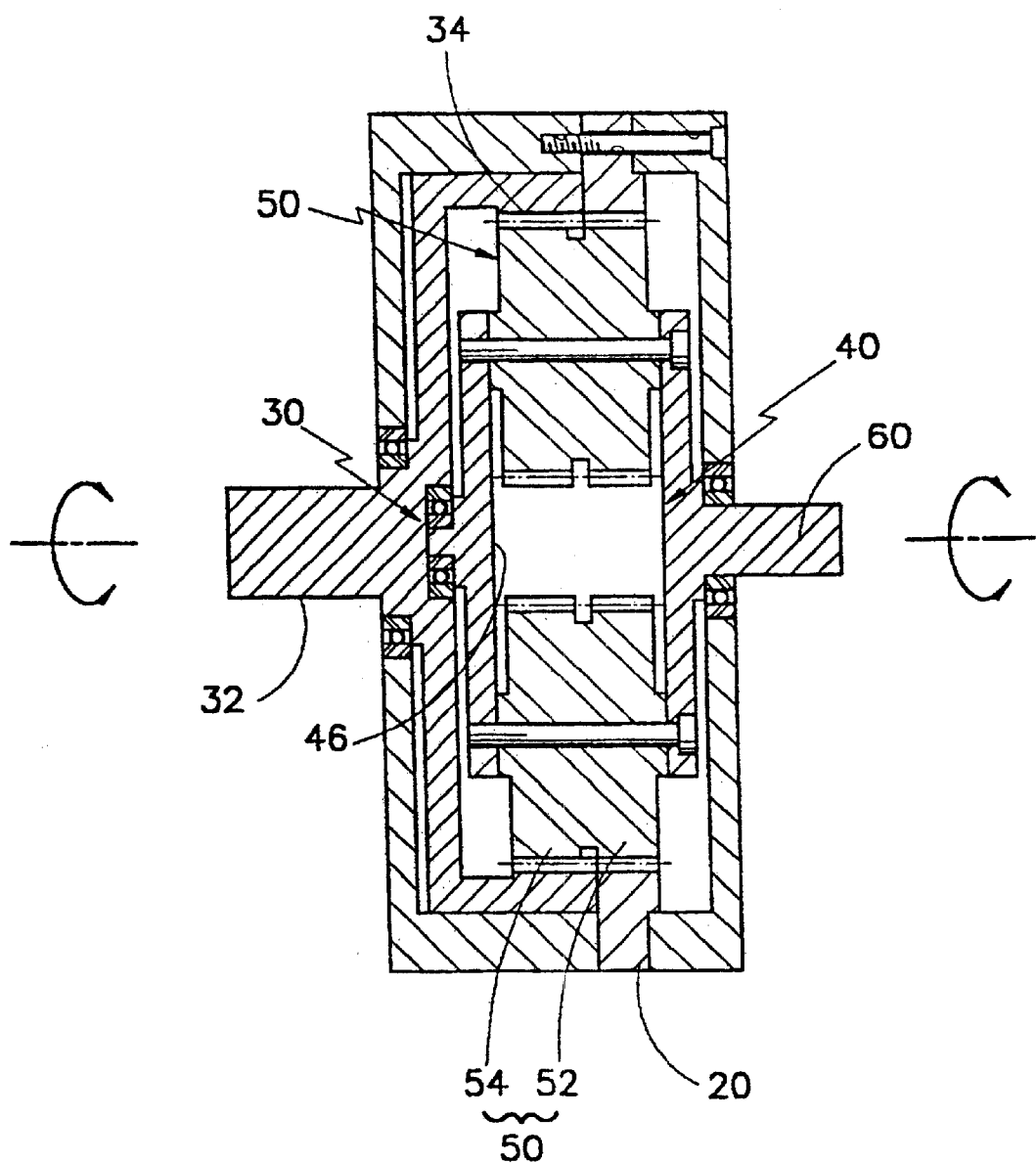
FIG. 1 is a cross-sectional view illustrating the conventional reduction apparatus.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
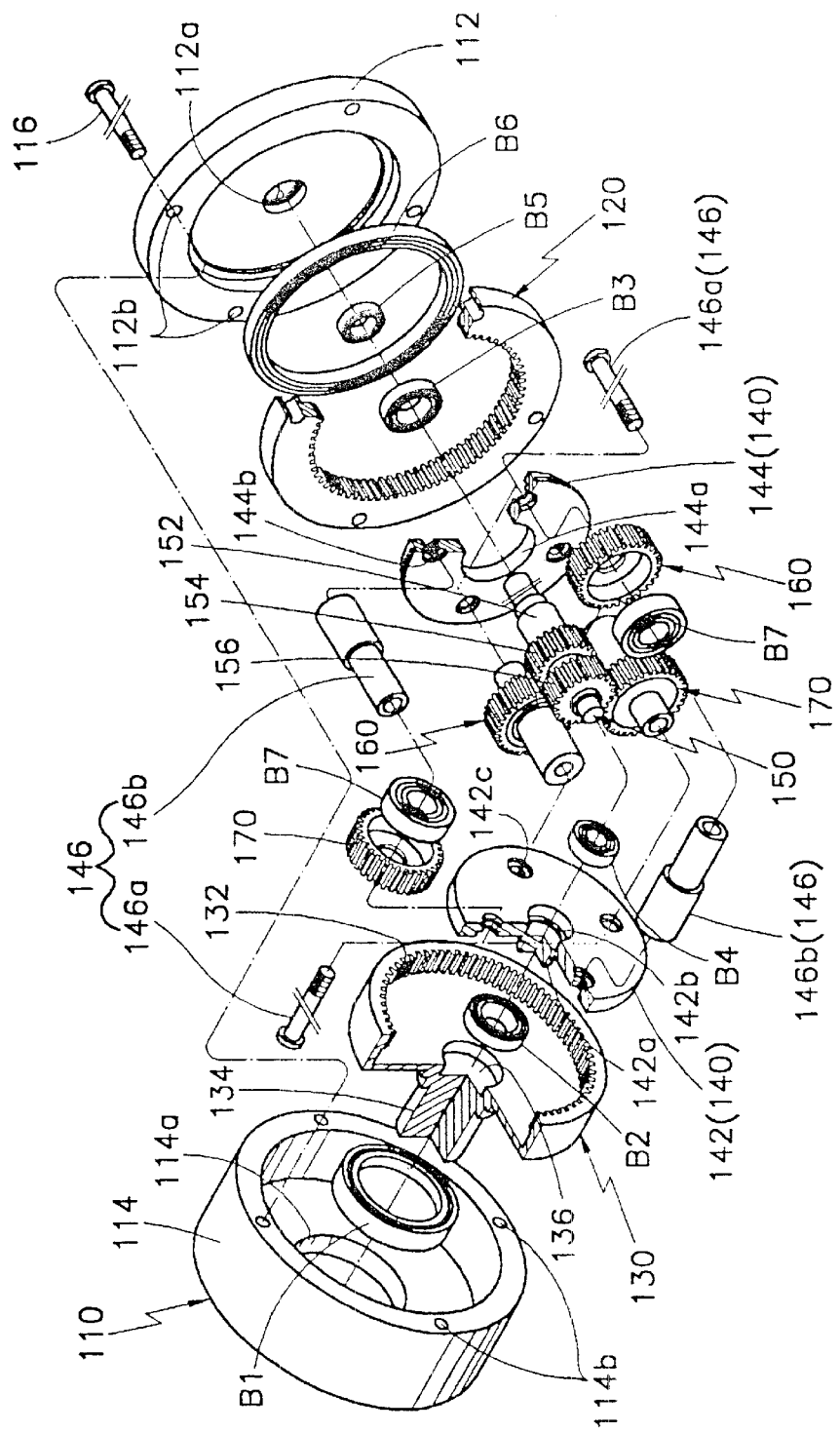
FIG. 2 is an exploded perspective view illustrating a reduction apparatus in accordance with an embodiment of the present invention.
Figure 3:
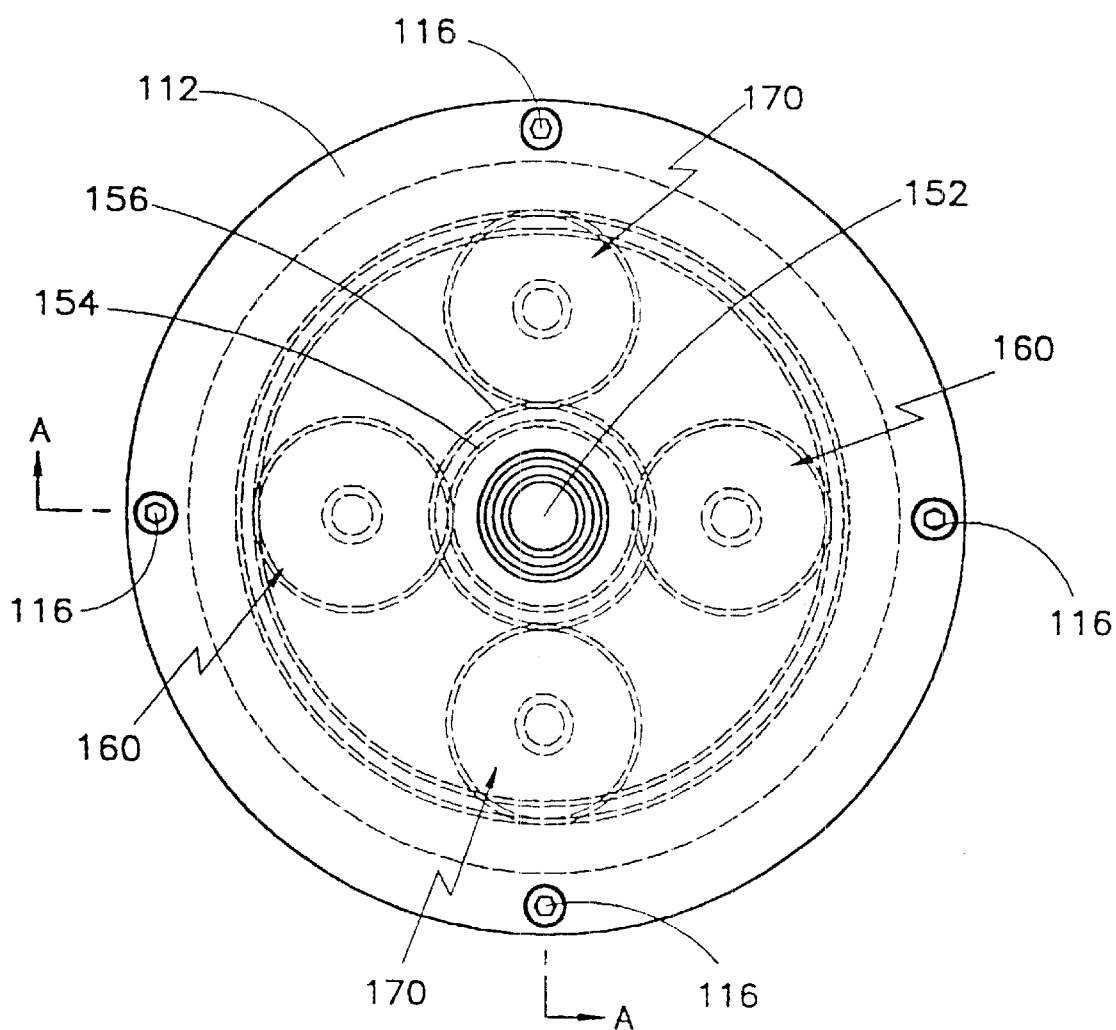
FIG. 3 is a schematic plan view illustrating the reduction apparatus in accordance with the embodiment of the present invention.

FIG. 2 is an exploded perspective view illustrating a reduction apparatus in accordance with an embodiment of the present invention; FIG. 3 is a schematic plan view illustrating the reduction apparatus in accordance with the embodiment of the present invention; and FIG. 4 is a cross-sectional view taken along the line A—A of FIG. 3, illustrating the reduction apparatus in accordance with the embodiment of the present invention.

Figure 4:
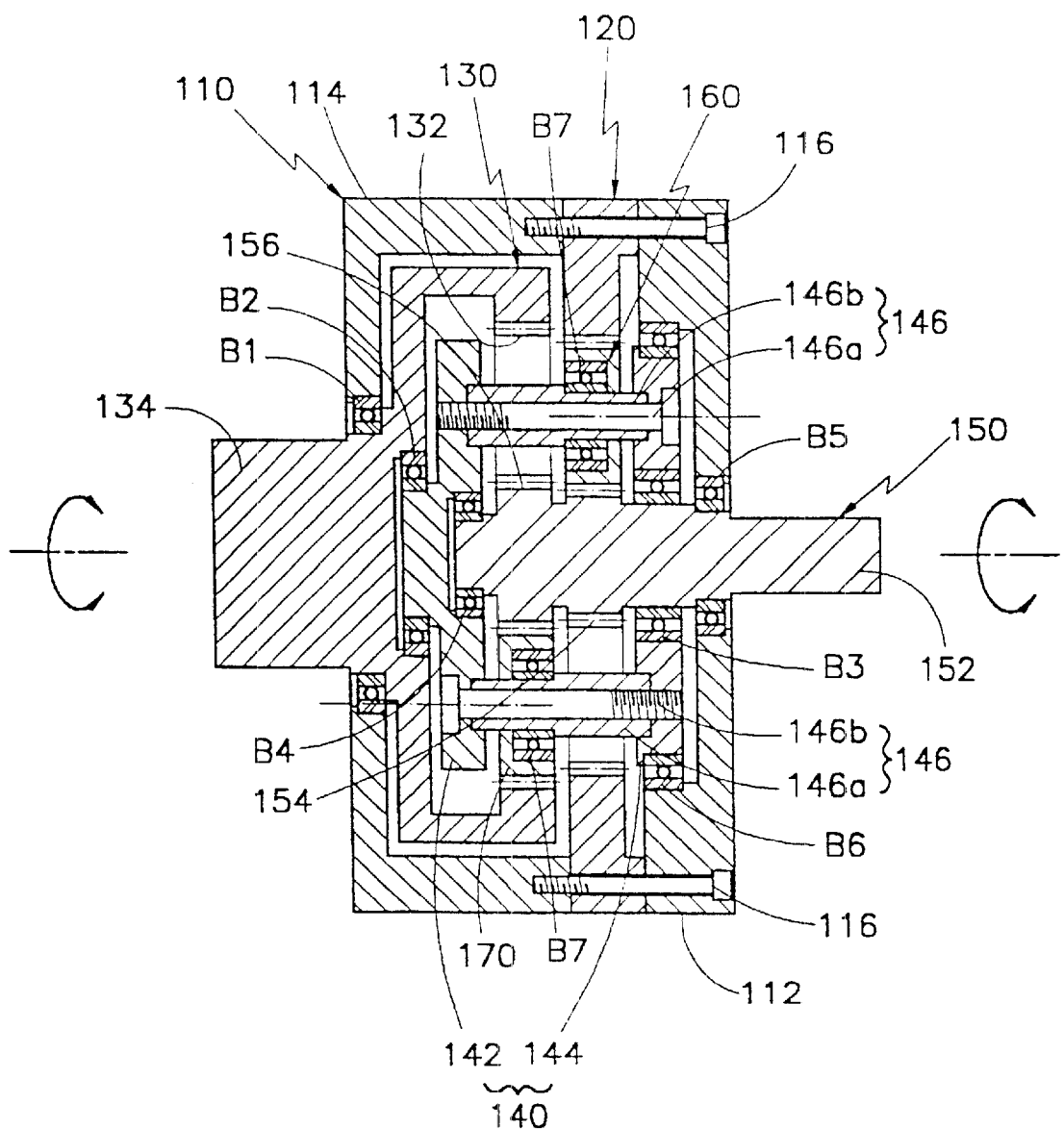
FIG. 4 is a cross-sectional view taken along the line A—A of FIG. 3, illustrating the reduction apparatus in accordance with the embodiment of the present invention.

As shown in FIGS. 2 through 4, a reduction apparatus in accordance with an embodiment of the present invention includes an input shaft 150 to which driving force is transferred from driving means (not shown), a pair of first planetary gears 160 and a pair of second planetary gears 170 which are rotated by the rotating force transferred to the input shaft 150, a fixed ring gear 120 which is meshed with the first planetary gears 160, an output member 130 which is meshed with the second planetary gears 170, a carrier 140 which rotatably supports the first and second planetary gears 160 and 170, and a case 110 which encases the above-described components.

The case 110 is formed by the fact that a pair of cylindrical members are detachably coupled with each other to define a receiving space therein. In other words, the case 110 has a first case part 112 and a second case part 114. The first case part 112 is placed so that it is connected to the driving means and is defined with a first center hole 112a through which the input shaft 150 is inserted into the case 110. The first case part 112 is also defined with a plurality of first locking holes 112b adjacent to a circumferential outer edge thereof. The second case part 114 is coupled to the first case part 112 so that it is opposite to the first case part 112. The second case part 114 is defined at a center portion thereof with a second center hole 114a and adjacent to a circumferential outer edge thereof with a plurality of second locking holes 114b which correspond to the plurality of first locking holes 112b.

The fixed ring gear 120 is sandwiched between the first and second case parts 112 and 114 and coupled to the first and second case parts 112 and 114 by means of a plurality of first locking bolts 116. The fixed ring gear 120 possesses a ring-shaped configuration, so that teeth are formed on a circumferential inner surface of the fixed ring gear 120. While it is preferred that the fixed ring gear 120 be formed as a separate member and intervened between the first and second case parts 112 and 114 as shown in FIG. 2, a person skill in the art will readily appreciate that the fixed ring gear 120 can be integrally formed on a circumferential inner surface of the first case part 112.

The output member 130 possesses substantially a cylindrical configuration. The output shaft 130 is rotatably received in the receiving space of the case 110 and has an output ring gear 132 and an output shaft 134. The output ring gear 132 is formed on a circumferential inner surface of the output member 130 in a manner such that the output ring gear 132 has an inner diameter which is the same as that of the fixed ring gear 120 and a gear ratio and a module which are respectively different from those of the fixed ring gear 120. The output shaft 134 is integrally formed on an outer surface of the output member 130 to project out of the case 110.

A bearing B1 is fitted into the second center hole 114a of the second case part 114 to rotatably support the output shaft 134, whereby precession and eccentricity of the output member 130 are prevented. Although it is preferred that the output ring gear 132 be integrally formed on the circumferential inner surface of the output member 130 as can be seen from FIG. 2, it is to be readily understood that the output ring gear 132 may be provided as a separate element to be closely fitted into the circumferential inner surface of the output member 130.

The carrier 140 has a first carrier member 142 and a second carrier member 144. The first carrier member 142 possesses a circular plate-shaped configuration and has a guide projection 142a and an input shaft-guiding groove 142b. The guide projection 142a is formed at a center portion of an outer surface of the first carrier member 142 to be rotatably supported on an inner surface of the output member 130. The input shaft-guiding groove 142b is defined at a center portion of an inner surface of the first carrier member 142. The second carrier member 144 is arranged to be opposite to the first carrier member 142 with a predetermined separation and to define an accommodating space between the first and second carrier members 142 and 144. The second carrier member 144 has an input shaft-inserting hole 144a which is defined at a center portion thereof. The second carrier member 144 also possesses a circular plate-shaped configuration.

The carrier 140 is rotatably supported by bearings B2 and B3 which are respectively fitted into a groove 136 defined at a center portion of the inner surface of the output member 130 and into the input shaft-inserting hole 144a of the second carrier member 144 and by a bearing B6 which is fitted between a circumferential outer surface of the second carrier member 144 and the circumferential inner surface of the first case part 112, whereby precession and eccentricity of the carrier 140 are prevented.

The first carrier member 142 and the second carrier member 144 are coupled to each other by a plurality of first and second connecting members 146 which are spaced apart one from another by a predetermined angle along a circumferential direction. To this end, the first and second carrier members 142 and 144 are defined with a plurality of third and fourth locking holes 142c and 144b, respectively. Each of the first and second connecting members 146 comprises a guide rod 146b which is inserted at both ends thereof into the third and fourth locking holes 142c and 144b of the first and second carrier members 142 and 144 and a second locking bolt 146a which are inserted through the guide rod 146b to be locked to the first carrier member 142 and the second carrier member 144. In this regard, the locking bolts 146a and the guide rods 146b of the first and second connecting members 146 are fitted and inserted in opposite directions from each other. The guide rod 146b possesses a round bar-shaped configuration and is formed with a stepped portion substantially at a middle thereof.

The input shaft 150 has a shaft portion 152 which is rotatably supported at one end thereof in the input shaft-guiding groove 142b of the first carrier member 142 and projects at the other end thereof out of the case 110 through the input shaft-inserting hole 144a of the second carrier member 144. The input shaft 150 further has a first sun gear 154 and a second sun gear 156 which are formed on a circumferential outer surface of the shaft portion 152 in a manner such that the first and second sun gears 154 and 156 are located between the first and second carrier members 142 and 144 and a gap is defined between the first and second sun gears 154 and 156.

The input shaft 150 is rotatably supported by a bearing B4 which is fitted into the input shaft-guiding groove 142b of the first carrier member 142 and by a bearing B5 which is fitted into the first center hole 112a of the first case part 112, whereby precession and eccentricity of the input shaft 150 are prevented.

The first planetary gears 160 are rotatably fitted around the first connecting members 146, respectively, which are secured to the first and second carrier members 142 and 144 in a manner such that the first connecting members 146 are spaced apart one from another by the predetermined angle along the circumferential direction. The first planetary gears 160 are meshed with the first sun gear 154 of the input shaft 150.

The second planetary gears 170 are rotatably fitted around the second connecting members 146, respectively, which are secured to the first and second carrier members 142 and 144 in a manner such that each second connecting member 146 is positioned between the pair of first planetary gears 160 in the circumferential direction. The second planetary gears 170 are meshed with the second sun gear 156 of the input shaft 150.

Bearings B7 are fitted around the guide rods 146b, respectively, to smooth rotation of the first and second planetary gears 160 and 170.

The first and second planetary gears 160 and 170 are formed in a manner such that they have different modules. At this time, the module of the second planetary gear 170 is larger than that of the first planetary gear 160 by a slight amount which is less than one, whereby a highly precise reduction ratio can be realized.

On the other hand, in the reduction apparatus of the present invention, although it is explained that two pairs of first and second planetary gears 160 and 170 are provided, a person skilled in the art will recognize that three or more pairs of planetary gears may be provided instead while not departing from the scope of the present invention.

According to the present invention, the first planetary gears 160, the fixed ring gear 120 and the first sun gear 154 have the same module, and the second planetary gears 170, the output ring gear 132 and the second sun gear 156 have the same module.

Hereinafter, operations of the reduction apparatus in accordance with the embodiment of the present invention, constructed as mentioned above, will be described in detail.

As can be readily seen from FIGS. 2 through 4, if the input shaft 150 is rotated as power is applied thereto from the outside driving means, the first planetary gears 160 which are meshed with the first sun gear 154 of the input shaft 150, rotates about their own axes, and at the same time, revolves around the first sun gear 154 in a state wherein the first planetary gears 160 are meshed with the fixed ring gear 120.

By this, due to the fact that the second planetary gears 170 which are meshed with the second sun gear 156, are also meshed with the output ring gear 132, the output member 130 including the output shaft 134 is rotated. At this time, a rotational velocity of the input shaft 150 which is rotated by the outside driving means (not shown), is reduced by a difference in the number of teeth or the module between the first and second planetary gears 160 and 170 or between the fixed ring gear 120 and the output ring gear 132, by which the reduced rotational velocity represents a rotational velocity of the output shaft 134.

Also, in the course wherein the output member 130 including the output shaft 134 is rotated in a forward or backward rotating direction which is the same as that of the input shaft 150, at the velocity which is reduced to obtain a predetermined reduction ratio, if no load is transferred to the input shaft 150 from the driving means, force for rotating the input shaft 150 in a reverse direction is generated due to a reverse load produced by the output shaft 134. At this time, even though the reverse load is transferred to the second planetary gears 170 through the output ring gear 132 of the output member 130, since the first planetary gears 160 having the number of teeth or the module which is different from that of the second planetary gears 170, are meshed with the fixed ring gear 120, the reverse load is braked not to be transferred to the input shaft 150, whereby it is possible to perform a reverse rotation preventing function without using a separate arrangement therefor.

In the meanwhile, as can be readily understood by the above statements, because it is possible to provide a separate rotating shaft for each of the first and second planetary gears thereby to allow the first and second planetary gears to have different modules, a large and highly precise reduction ratio can be accomplished by the present invention, which will be hereinafter described in further detail in comparison with a structure of the conventional reduction apparatus.

FIG. 5 is a cross-sectional view for explaining operations of the reduction apparatus in accordance with the embodiment of the present invention. FIG. 5a schematically illustrates the conventional reduction apparatus in which first and second planetary gears g2 and g5 are integrally coupled to the same rotating shafts, and FIG. 5b schematically illustrates the reduction apparatus according to the present invention in which first and second planetary gears G2 and G5 are coupled to different rotating shafts.

For example, first, in the conventional reduction apparatus as shown in FIG. 5a, the first and second planetary gears g2 and g5 are integrally coupled to the same rotating shafts. When assuming that sun gears g1 and g4 have the same number of teeth of 10, the first and second planetary gears g2 and g5 have the same number of teeth of 30, a module of gears g1, g2 and g3 is 1.1, and a module of gears g4, g5 and g6 is 1.5, that is, in the case that a reduction is implemented only by using different modules between the upper gears g1, g2 and g3 and the lower gears g4, g5 and g6, by using a calculating equation d=Z*m where d is a diameter of a pitch circle, Z is a number of teeth and m is a module, a pitch circle diameter of the gear g1 is calculated as 11 (d=10*1.1) and a pitch diameter of the gear g2 is 33 (d=30*1.1), whereby a distance x between center lines of the first rotating shaft s1 and the second rotating shaft s2 is calculated as 22 (x=(11+33)/2).

Using the same method, it will be appreciated that a pitch circle diameter of the gear g4 is calculated as 15 (d=10*1.5) and a pitch circle diameter of the gear g5 is 45 (d=30*1.5), whereby a distance x' between center lines of the first rotating shaft s1 and the second rotating shaft s2 is calculated as 30 (x=(15+45)/2).

That is to say, because the distances x and x' between center lines of the upper gears and the lower gears are different from each other, the first and second planetary gears g2 and g5 cannot be adequately arranged. Even if the gears are configured in a manner such that the distances x and x' are to be the same, due to the fact that a number of teeth of the output ring gear g6 cannot be an integer (represented as Z=d/m=77/1.5=51.33), in the construction in which the first and second planetary gears g2 and g5 are integrally formed on the same rotating shafts, different modules cannot be obtained, whereby it is impossible to realize a highly precise reduction ratio which can be enabled by effecting different modules.

On the contrary, in the reduction apparatus as shown in FIG. 5b, the first and second planetary gears G2 and G5 have different rotating shafts S2 and S3, respectively. When assuming that sun gears G1 and G4 have the same number of teeth of 10, the first and second planetary gears G2 and G5 have the same number of teeth of 30, a module of gears G1, G2 and G3 is 1.1, and a module of gears G4, G5 and G6 is 1.5, that is, in the case that a reduction is implemented only by using different modules between the upper gears G1, G2 and G3 and the lower gears G4, G5 and G6, by using the above calculating equation d=Z*m where d is a diameter of a pitch circle, Z is a number of teeth and m is a module, a pitch circle diameter of the gear G1 is calculated as 11 and a pitch diameter of the gear G2 is 33, whereby a distance X between center lines of the first rotating shaft S1 and the second rotating shaft S2 is calculated as 22. Using the same method, it will be appreciated that a pitch circle diameter of the gear G4 is calculated as 15 and a pitch circle diameter of the gear G5 is. 45, whereby a distance X' between center lines of the first rotating shaft S1 and the second rotating shaft S2 is calculated as 30. Although the distances X and X' between center lines of the upper gears and the lower gears are different from each other as in the conventional reduction apparatus, in the present invention, because a separate third shaft S3 to which the lower gears G5 are coupled, is provided as an independent shaft, it is possible to move the position of the third shaft S3 outward of a carrier C. As a consequence, in the present invention, even though modules of upper and lower gears are different from each other, it is possible to construct a reduction apparatus.

Hence, in the construction of the present invention in which the first and second planetary gears 160 and 170 are coupled to their own rotating shafts, different modules of the first and second planetary gears 160 and 170 can be effected. Therefore, by the fact that the reduction function can be implemented not only by differentiating numbers of teeth but also by differentiating modules, a highly precise reduction ratio can be obtained. For example, by machining gears in a manner such that a difference between modules is less than 1, a highly precise reduction ratio can be obtained.

Figure 6:
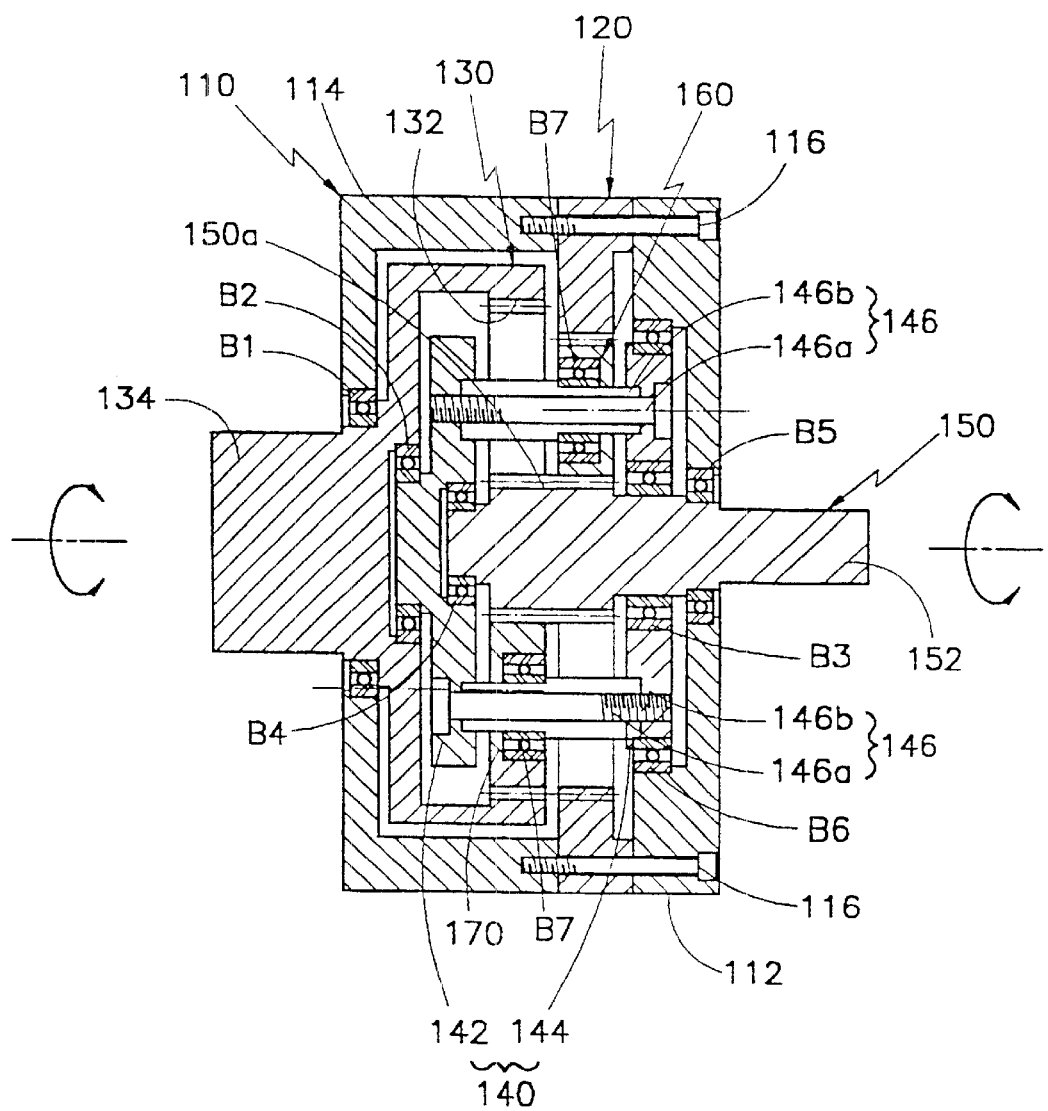
FIG. 6 is a cross-sectional view illustrating a reduction apparatus in accordance with another embodiment of the present invention.

On the other hand, FIG. 6 is a cross-sectional view illustrating a reduction apparatus in accordance with another embodiment of the present invention. This figure is a view which is obtained by cross-sectioning the reduction apparatus in accordance with another embodiment of the present invention along a line which is the same as that of FIG. 3.

In the above described embodiment of the present invention, since the first sun gear 154 and the second sun gear 156 must be separately formed on the input shaft 150 which has relatively a small size, or separately manufactured first sun gear 154 and the second sun gear 156 must be affixed around the output shaft 150, it is difficult to machine the teeth of the input shaft 150, skillfulness of a high level is required, and the number of assembling and machining processes is increased. To cope with these, in another embodiment of the present invention, as shown in FIG. 6, a single sun gear 150a is formed on the input shaft 150 to serve as both of the first and second sun gears of the first embodiment.

Namely, due to the fact that the first and second sun gears of the input shaft 150 are integrated with each other, the same module is obtained, and thereby the first and second planetary gears 160 and 170 which are meshed with the first and second sun gears, and the fixed ring gear 120 and the output ring gear 132 which are meshed with the first and second planetary gears 160 and 170, have the module.

By this embodiment of the present invention, a process for forming the teeth on the input shaft is simplified and does not require skillfulness of a high level, whereby machining and assembling of the input shaft 150 can be conducted in a convenient and easy manner. Also, since the first and second planetary gears 160 and 170 are coupled to their own rotating shafts, although the respective gears have the same module, because it is possible to change the number of teeth in a diverse manner, a highly precise reduction ratio can be obtained.

INDUSTRIAL APPLICABILITY

As a result, the reduction apparatus according to the present invention provides advantages in that a large reduction ratio can be obtained by differentiating numbers of teeth of first and second planetary gears and a reverse rotating preventing function is performed without using a separate arrangement therefor. In particular, since a separate connecting member is provided for each of the rotating shafts of the first and second planetary gears, a highly precise reduction ratio can be obtained by differentiating modules of the planetary gears or with the same module of the planetary gears.

What is claimed is:

1. A reduction apparatus comprising:
  a cylindrical case having a pair of case parts which are detachably assembled with each other to define a receiving space;
  a fixed ring gear sandwiched between and coupled to the pair of case parts and having teeth which are formed on a circumferential inner surface thereof;

an output member rotatably received in the receiving space of the case and having an output ring gear and an output shaft, the output ring gear being formed on a circumferential inner surface of the output member in a manner such that the output ring gear has an inner diameter which is the same as that of the fixed ring gear and a gear ratio and a module which are respectively different from those of the fixed ring gear, the output shaft being integrally formed on an outer surface of the output member to project out of the case;

a carrier having a first carrier member and a second carrier member, the first carrier member possessing a circular plate-shaped configuration and having a guide projection and an input shaft-guiding groove, the guide projection being formed at a center portion of an outer surface of the first carrier member to be rotatably supported on an inner surface of the output member, the input shaft-guiding groove being defined at a center portion of an inner surface of the first carrier member, the second carrier member being arranged to be opposite to the first carrier member with a predetermined separation and to define an accommodating space between the first and second carrier members, the second carrier member having an input shaft-inserting hole which is defined at a center portion thereof;

an input shaft having shaft portion which is rotatably supported at one end thereof in the input shaft-guiding groove of the first carrier member and projects at the other end thereof out of the case through the input shaft-inserting hole of the second carrier member, the input shaft further having a first sun gear and a second sun gear which are formed on a circumferential outer surface of the shaft portion in a manner such that the first and second sun gears are located between the first and second carrier members and a gap is defined therebetween;

a plurality of first planetary gears rotatably fitted around a plurality of first connecting members, respectively, which are secured to the first and second carrier members in a manner such that the first connecting members are spaced apart one from another by a predetermined angle along a circumferential direction, the first planetary gears being meshed with the first sun gear of the input shaft; and a plurality of second planetary gears rotatably fitted around a plurality of second connecting members, respectively, which are secured to the first and second carrier members in a manner such that each second connecting member is positioned between two first planetary gears in the circumferential direction, the second planetary gears being meshed with the second sun gear of the input shaft.

2. The reduction apparatus as claimed in claim 1, wherein a module of the plurality of second planetary gears is larger than that of the plurality of first planetary gears by an amount which is less than one.

3. A reduction apparatus comprising:

a cylindrical case having a pair of case parts which are detachably assembled with each other to define a receiving space;

a fixed ring gear sandwiched between and coupled to the pair of case parts and having teeth which are formed on a circumferential inner surface thereof;

an output member rotatably received in the receiving space of the case and having an output ring gear and an output shaft, the output ring gear being formed on a circumferential inner surface of the output member and the output shaft being integrally formed on an outer surface of the output member to project out of the case;

a carrier having a first carrier member and a second carrier member, the first carrier member possessing a circular plate-shaped configuration and having a guide projection and an input shaft-guiding groove, the guide projection being formed at a center portion of an outer surface of the first carrier member to be rotatably supported on an inner surface of the output member, the input shaft-guiding groove being defined at a center portion of an inner surface of the first carrier member, the second carrier member being arranged to be opposite to the first carrier member with a predetermined separation and to define an accommodating space between the first and second carrier members, the second carrier member having an input shaft-inserting hole which is defined at a center portion thereof;

an input shaft having shaft portion which is rotatably supported at one end thereof in the input shaft-guiding groove of the first carrier member and projects at the other end thereof out of the case through the input shaft-inserting hole of the second carrier member, the input shaft further having a first sun gear and a second sun gear such that the first and second sun gears are located between the first and second carrier members and a gap is defined therebetween;

a plurality of first planetary gears rotatably fitted around a plurality of first connecting members, respectively, which are secured to the first and second carrier members in a manner such that the first connecting members are spaced apart one from another by a predetermined angle along a circumferential direction, the first planetary gears being meshed with the first sun gear of the input shaft; and a plurality of second planetary gears rotatably fitted around a plurality of second connecting members, respectively, which are secured to the first and second carrier members in a manner such that each second connecting member is positioned between two first planetary gears in the circumferential direction, the second planetary gears being meshed with the second sun gear of the input shaft and wherein the first sun gear which is meshed with the first planetary gears, is integrally formed on the input shaft in a manner such that teeth of the first sun gear have the same module as the first and second planetary gears, and the fixed ring gear and the output ring gear which are respectively meshed with the first and second planetary gears, are formed to have the same module.

* * * * *